US009218721B2

(12) United States Patent
Herbert

(10) Patent No.: US 9,218,721 B2

(45) Date of Patent: Dec. 22, 2015

(54) PARI-MUTUEL BONUS ROUND FOR HISTORICAL RACING DEVICE

(71) Applicant: Richard A. Herbert, Riverside, IL (US)

(72) Inventor: Richard A. Herbert, Riverside, IL (US)

( * ) Notice: Subject to any disclaimer, the term of this patent is extended or adjusted under 35 U.S.C. 154(b) by 0 days.

(21) Appl. No.: 14/218,192

(22) Filed: Mar. 18, 2014

(65) Prior Publication Data

US 2014/0287805 A1 Sep. 25, 2014

Related U.S. Application Data

(60) Provisional application No. 61/802,783, filed on Mar. 18, 2013.

(51) Int. Cl.
*A63F 13/00* (2014.01)
*G07F 17/32* (2006.01)

(52) U.S. Cl.
CPC ........ *G07F 17/3288* (2013.01); *G07F 17/3244* (2013.01)

(58) Field of Classification Search
CPC ............ G07F 17/3225; G07F 17/3227; G07F 17/3267
USPC .................................................. 463/6, 22, 28
See application file for complete search history.

(56) References Cited

U.S. PATENT DOCUMENTS

| | | | | |
|---|---|---|---|---|
| 5,888,136 | A * | 3/1999 | Herbert | 463/22 |
| 6,152,822 | A * | 11/2000 | Herbert | 463/22 |
| 7,742,972 | B2 * | 6/2010 | Lange et al. | 705/37 |

* cited by examiner

*Primary Examiner* — Allen Chen

(74) *Attorney, Agent, or Firm* — Wood, Phillips, Katz, Clark & Mortimer

(57) ABSTRACT

A method of, and system for, wagering. The method includes the step of providing a random number generator that has a wagering base that is derived at least in part from the outcome of at least one horse/dog race or jai alai game that has previously been completed. Certain information in the wagering base is based at least in part on the outcome of the at least one horse/dog race or jai alai game and is accessible through an input wager, with the probability of accessing the certain information in the wagering base through an input wager being different. Input wagers are directed to the random number generator during the wagering period from each of multiple locations. Between when preliminary and final return amounts are identified for a first input wager that accesses the certain information, based at least in part upon the number of input wagers that have accessed the certain information, an updated return amount is identified for the first input wager.

4 Claims, 2 Drawing Sheets

PARI-MUTUEL BONUS ROUND FOR HISTORICAL RACING DEVICE

CROSS-REFERENCE TO RELATED APPLICATIONS

This application is a non-provisional of Application Ser. No. 61/802,783, filed Mar. 18, 2013.

BACKGROUND OF THE INVENTION

1. Field of the Invention

This invention relates to Historical Racing using a pari-mutuel format and, more particularly, to a bonus round during which at least one return amount is identified as a wagering period is progressing and between when preliminary and final return amounts are identified.

2. Background Art

New slot-like devices, such as those based on Historical Race results and with wagering conducted utilizing the pari-mutuel process, have recently been significantly impacting the marketplace. These devices need to offer an entertaining experience in order to establish a sustained following in today's fiercely competitive marketplace of class II and class III Fixed Odds Slot Machines. A key element, of the "entertainment experience" of modern Fixed Odds Slot Machines, is the new Penny Video Slot Machines making up about 75% of the revenue from all slot machines. The heart of the Penny Video Slot is the "bonus round" (animated, augmented soundtrack, game within a game awarding money). To be competitive in a sustained way with the Penny Video Slot Machines, slot-like devices based on Historical Race results and using a pari-mutuel format, need something equally as enticing as the bonus round. Heretofore nothing has existed in the marketplace to achieve this end.

SUMMARY OF THE INVENTION

One aspect of the invention is the implementation of a form of bonus round (hereinafter referred to as the "Pari-Mutuel Bonus Round") seamlessly into Historical Racing Devices in a manner that allows the Pari-Mutuel Bonus Round to potentially perform an important dual function. The first function is entertainment as in the manner of the modern Penny Video Slot Machines. Of note is that up to 35-40% of money paid to a player in any session comes from the bonus rounds in Fixed Odds Video Penny Slot Machines. In order to compete with these Fixed Odds Slots the Historical Racing Devices need to provide something with entertainment value similar to that for a conventional bonus round.

The second function is to operate in concert with the strict rules and regulations required of pari-mutuel wagering on racing while doing so in a complex entertaining manner that is essential for commercial success.

As described herein, the Pari-Mutuel Bonus Round potentially becomes the instrument for meeting both these critical needs of Historical Racing Devices wagering on past race results of conventional horse/dog racing or other competitive event to make the format pari-mutuel in a legal sense. Generally, in the absence of utilizing the inventive concepts, the Historical Racing Devices could not both meet the pari-mutuel requirements of wagering on racing and also offer the entertainment value of the typical Fixed Odds Penny Video Slot Machine. The Pari-Mutuel Bonus Round, as taught herein, potentially entertains the player in a like manner as a modern Video Penny Slot while allowing the Historical Racing Device to meet the strict standards of pari-mutuel wagering on racing as regulated by law, rules, and regulations in the various racing jurisdictions. In the absence of using the inventive concepts, a timely, accurate pari-mutuel payout cannot take place and the device functions effectively as the older electromechanical Fixed Odds Slot Machines. In such a case the Historical Racing Device would be anticipated to make only an initial estimated payment followed 20, 30, 60 minutes later by a final residual payment. While this operation could meet strict pari-mutuel standards, there are two major problems.

First, the bonus rounds which are now so popular would be eliminated as there would be no way to pari-mutuelly fund them. Second, the amount of money withheld from the player after 30 minutes of play would be a large portion of the player's bankroll and would seriously depress play. A player would need to wait for the "game" to end to collect and only then be able to use the residual payments due him/her. The invention potentially solves both problems in an efficient and effective manner.

It should be noted that any Historical Racing Device not meeting the current conventional racing pari-mutuel laws, rules, and regulations, as promulgated in the various racing jurisdictions, would not be currently legal and would then require legislation to be used. The Pari-Mutuel Bonus Round, as applied herein to Historical Racing Devices, meets, to the letter of the law, all rules, regulations, and statutes that govern pari-mutuel racing in the racing states, including in the state of Kentucky, as recently decided by its Supreme Court in Case No. 2012-SC-000414-DG, on Feb. 20, 2014. It additionally potentially provides the players the entertainment value of the bonus rounds of Fixed Odds Penny Video Slot Machines while using a novel method of pari-mutuel compliant payments.

In one form, the invention is directed to a method of wagering during a wagering period. The method includes the steps of: providing a random number generator that has a wagering base that is derived at least in part from the outcome of at least one horse/dog race or jai alai game that has previously been completed; identifying in the wagering base certain information in the wagering base that is based at least in part on the outcome of the at least one horse/dog race or jai alai game that has previously been completed and accessible through an input wager and wherein the probability of accessing the certain information in the wagering base through an input wager is different; directing input wagers to the random number generator during the wagering period from each of multiple locations; identifying whether input wagers from the multiple locations have accessed any of the certain information in the wagering base; before the expiration of the wagering period, identifying a preliminary return amount for a first input wager that accesses the certain information in the wagering base based at least in part upon the total number of input wagers from the multiple locations that have accessed the certain information; identifying a final return amount for the first input wager that accessed the certain information, the final return amount identified at the expiration of the wagering period based at least in part upon the total number of input wagers from the multiple locations that accessed the certain information upon the expiration of the wagering period; and during the wagering period, between when the preliminary and final return amounts are identified, identifying an updated return amount for the first input wager that accessed the certain information in the wagering base based at least in part upon the number of input wagers from the multiple locations that have accessed the certain information.

In one form, the invention is directed to a wagering system having a random number generator that has a wagering base which is randomly accessed by an input wager. The wagering base includes certain information that is based at least in part upon the outcome of at least one horse/dog race or jai alai game that has been completed with a pre-assigned probability value for accessing the certain information in the wagering base through each input wager. A plurality of input wagering terminals are provided for directing an input wager to access the certain information. At least one processor is configured to identify: a) a preliminary return amount for a first input wager that accesses the certain information in the wagering base based at least in part upon the number of input wagers from the plurality of input wagering terminals that have accessed the certain information during a wagering period; b) a final return amount for the first input wager that accessed the certain information at the expiration of the wagering period based at least in part upon the number of input wagers from the plurality of input wagering terminals that have accessed the certain information in the wagering base upon the expiration of the wagering period; and c) an updated return amount for the first input wager that accessed the certain information in the wagering base based at least in part upon the number of input wagers from the plurality of input wagering terminals that have accessed the certain information during the wagering period between when the preliminary and final return amounts are identified.

DETAILED DESCRIPTION OF THE PREFERRED EMBODIMENT

Figure 1:
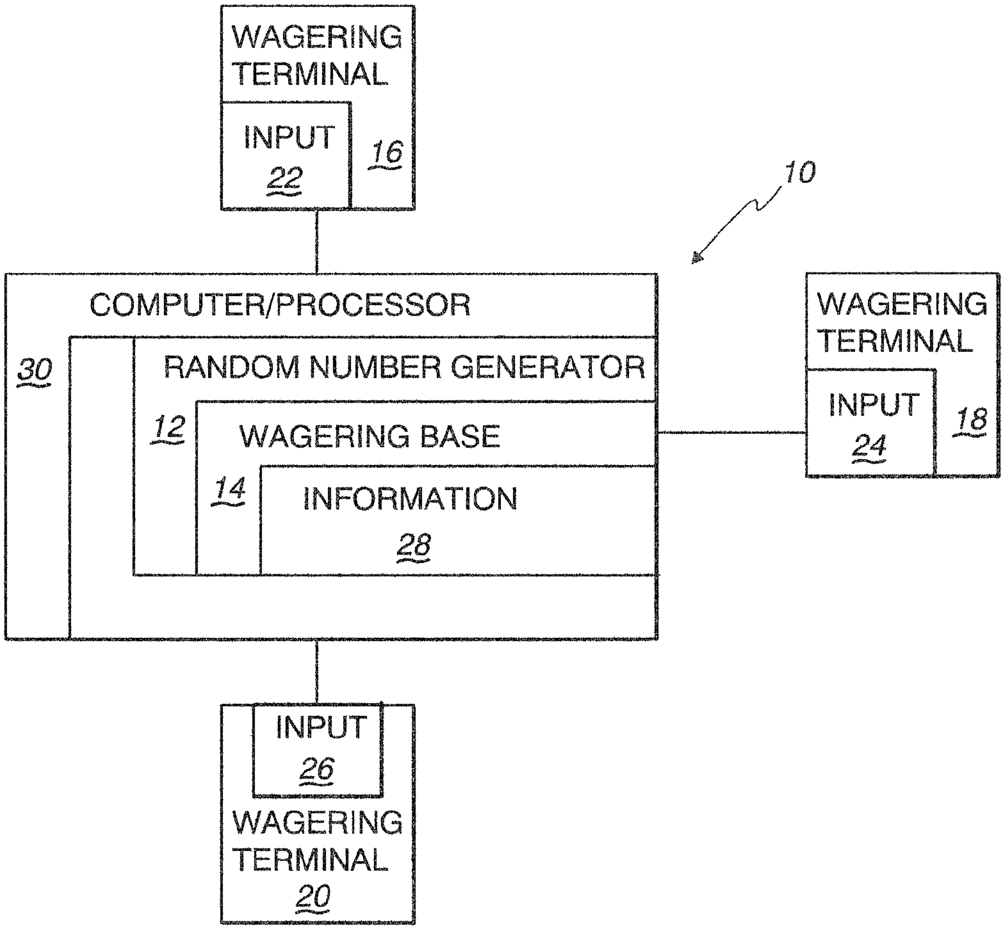
FIG. 1 is a schematic representation of a wagering system, according to the present invention.

Initially, an outline of the pari-mutuel functions of the Pari-Mutuel Bonus Round is in order. There are currently no bonus rounds that exist in Historical Racing Devices that are conducted in accordance with pari-mutuel rules and regulations that govern wagering on horse racing. The rules that govern pari-mutuel wagering on regular conventional horse racing can be applied to this methodology without any question that that for Historical Racing would comport with such rules and regulations with equal conformance. One comparative example will now be described using a nine horse win pool and then using the same pool as an example for Historical Racing, applying the inventive methodology, i.e. using the Pari-Mutuel Bonus Round. This will demonstrate how to employ the invention in its application to Historical Racing.

In Conventional Racing perhaps this wagering pool might ensue:

| Win Pool | Gross Betting |
|---|---|
| #1 | $500 |
| #2 | $400 |
| #3 | $1200 |
| #4 | $600 |
| #5 | $100 |
| #6 | $300 |
| #7 | $50 |
| #8 | $200 |
| #9 | $700 |
| | $4050 − 18% Commission =$3321 net pool |

#1 wins: Payout = 3321 − 500 = 2821 to 500 = 5.642 to 1 = $2 win Bet = $13.284.

In conventional racing we see a betting pool accumulated and processed. The race is run with #1 winning and the processed pool then has a winner to determine a $13.20 payout (after breakage to 10¢ and an 18% pool commission.)

The same example will now be described for Historical Racing but without utilizing the invention. As a basis for the Historical Racing example, the exact race of the above conventional race example will be used. #1 won the race and as described, for example, in U.S. Pat. Nos. 5,888,136 and 6,152,822, showing the "Herbert Historical Racing Devices and incorporated in their entirety herein by reference, a probability for #1 is calculated at 500÷4050=0.12345679012. Similar P values (probabilities) are calculated for #2-#9. The random number generator, as employed in conventional racing, to make quick picks, and in the patented Herbert Historical Racing Devices to also make quick picks, is weighted in the Herbert Historical Racing Devices—for example, numbers 1 through 9 with their respective P values. The players then execute win pool bets for varying amounts of money and the weighted random number generator makes betting number selections for the bettor. Should the bettor lose (not access #1) their money accumulates in the win pool. Should the bettor win (access #1) the player receives an immediate initial payment, which for purposes of example here, we can call 65% of the expected finishing odds. Odds equal the inverse of the probability minus one. In our example $$\frac{1}{0.123345679012} - 1 = 7.10000000022$$

We use 7.1 to 1. While we use here 65%, or 4.615 to 1 to make the initial payment, a far more sophisticated algorithm may more accurately be used.

As an example, say one were set to flip a coin 1,000 times. Before the flips start the best predictor of results would be 500 Heads and 500 Tails. But during the course of the flipping, suppose the first 10 flips would all be heads. At that point, 10 flips in, the best prediction becomes 505 Heads and 495 tails. Reversion to the mean will always take place following any sequence of trials from that point to the finish of all trials. Now suppose the next 6 flips all fall tails. At this exact point 10 heads, 6 tails. The best final outcome prediction now would be 502 heads and 498 tails. In Historical Racing, despite having a fixed probability for an event (#1 winning P=0.1234579012), the odds at the close of the pool will be determined by the actual trial results as far as payout is concerned. During intermediate trial compilations, at any exact point in time, an algorithm taking into account the completed trials and then estimating how many more trials probably remain (using a time function augmented by the rate of bettor's bets, the amounts being bet, and the number of bettors playing) and factoring in Reversion to the Mean can give a very accurate predicted final payout for any given winner. But to simplify illustration, here we will use for the initial payment a flat 65% of the expected initial odds calculated from the initial programmed probability. Different type betting pools that incorporate very high odds (very low programmed P value) will use more conservative percentages based on designed algorithms but illustrated as 35-50% for initial payments because these pools will be more volatile as to the size of probable excursions between expected payouts versus actual payouts on a pool's closing.

Returning to our example, an initial payment of 4.615 times the player's bet is made. The balance, which really will not be known until the pool closes, can be estimated, should be 7.1-4.615=2.485 times that player's bet (plus the return of the player's bet). This ignores commissions for simplicity in this example of Historical Racing, though we show the payout in the conventional race at 5.642 to 1 because of an 18% commission.

While this 2.485 times the bet plus the bet is a good example of an approximation, we must wait until the pool closes before we can know the final residual payout (This invention will use complex algorithms to determine both the initial payout and the here to be disclosed novel intermediate payments, while the remainder will constitute the final residual payment). To conclude this example let's say slightly more #1's came up than expected and our residual payment on pool close calculated to only 2.396 times the player's bet plus his/her bet back. Factoring in a commission of about 10%, a $2 bet here would come out at $14.41 (using 1¢ breakage). Compare this to the $13.20 using 10¢ breakage and an 18% commission of the $2 payout in the conventional race.

Now we will run the same example for a Historical Racing game employing the inventive Pari-Mutuel Bonus Round. This will solve the problem noted earlier; namely that with only two payments to total the full pari-mutuel payout a bettor would wait, perhaps up to an hour, for all his/her winning residual payments to be made to him/her. This amount, with dozens and more winning bets achieved over an hour, represents perhaps 40% of a player's money withheld for an extended time period. This would prove untenable on a gambling floor as a player would face an 'effective take' of approximately 40% for most of an hour. Then this large reservoir of money would be paid the player resulting in an average game take of perhaps 10% (if the take was set at that level). This negative volatility would not be tolerated by players after a few games played.

The invention also has the potential to serve the entertainment function for Historical Racing Devices that bonus rounds do within the Fixed Odds Slot Industry. All the entertaining elements will be engineered into it. Animation with vivid colors, a story theme, sound effects consistent with the story theme, a game within a game to amuse and entertain and excite the player, etc. are contemplated. This Historical Racing Bonus Round allows a Historical Racing Device, that plays pari-mutuelly, to become a practical alternative, entertainment-wise, to a Fixed Odds Slot.

A word about funding bonus rounds is in order here. In Fixed Odds Slots, two methods are used. A common prize money source is simply that the player has already won the money he/she will be awarded in the bonus round when the random number generator stopped on a specific prize amount. The game may award the player some money instantly and then proceed to the bonus round or there may be no instant award and the player is immediately sent into the bonus round "game within a game". In either case a game appears and the player is asked to participate (some machines have a bypass application where they push a button and are immediately paid their destined award and then they can continue play). Then the player participates in a game that entertains but has no relationship to the already decided prize money they are destined to win. (Regulations exist where, should the bonus game represent things like cards or dice, where probabilities are known, the following methodology is used.)

Another bonus round methodology in the Fixed Odds Industry is where the player via a winning prize accessed is sent into a bonus round where chance is at play in determining what a player will achieve. In the Fixed Odds Industry, a sophisticated "take" program can make allowances for many players to enter this probability accessed bonus round and mold this side path into the entire take determination percentage needed to both insure the set take (e.g., 12%) while allowing some players to actually have chance play a part in their bonus round winnings.

In Historical Racing, according to the invention as hereinbelow described, two different methodologies are offered to fund the Pari-Mutuel Bonus Round. Uniquely, as described above, in Historical Racing when a player wins a bet it is unknown for some time (only when the pool associated with the winning bet fully matures, accepts all its bets, and closes can the players who accessed the winners in that pool have their winning bets exactly calculated) what his/her final payout will total. But, it is known, the probability of the bet, the number of people betting, how much and how fast they are betting, and the usual lifespan of a wagering pool. From this data an accurate prediction can be made of the range of total payouts any such bet will likely ultimately generate. Therefore, initial payment is made, and a final "truing" payment is made when the pool closes to equalize the payout to all winners. But the subject of primary concern are the in-between payments created and made as the source of funding for these Pari-Mutuel Bonus Rounds. A number of determiners programmed into the Historical Racing server dictate when, how much, and how often these intermediate payments are to be made. This method is analogous to the first described pre-determined funding method the Fixed Odds Slots use but is controlled by a totally different method—the pari-mutuel estimated total winnings of the player. As in the Fixed Odds pre-determined prize amount, the players' actions in "game within games" in these Pari-Mutuel Bonus Rounds also are meaningless as far as affecting money awarded. But the invention herein contemplates another method of funding the Pari-Mutuel Bonus Rounds where things within the Pari-Mutuel Bonus Round game within a game do affect what a player will win. This method comports with all conventional racing pari-mutuel rules and regulations and as such there is nothing before it to compare it to. It is unique in its methodology. Everything in this alternative must involve a bettor making a new bet within the Pari-Mutuel Bonus Round and an individual, totally separate pari-mutuel pool, is created by all the betting players. Each player who wins must win an equal share of the pool in ratio to the bet size made.

To accomplish this the regular bonus round method, previously described, is used as the basic Pari-Mutuel Bonus Round, but an amount is deducted from each player from that Pari-Mutuel Bonus Round to fund this separate new pari-mutuel pool. As an example, say 500 people are playing (a relatively large number of players is best for this alternative Pari-Mutuel Bonus Round method to be added to the regular Pari-Mutuel Bonus Round methodology). When this feature is used and the pari-mutuel pool is created, it is given a predetermined life of, e.g., 30 minutes. During this 30 minute period any player entering the regular Pari-Mutuel Bonus Round will have perhaps 50¢ to $10.00 deducted from the total predetermined payouts that are due to be made to that player. A table determining the minimum 50¢ total bet might say a player has to have sufficient payments "coming" (predicted) to have this minimum 500 pulled and bet into this separate Pari-Mutuel Bonus Round pool. Then it escalates upward until say a maximum of $10 to $20 is pulled from players having substantially more money predicted to be due them. Then a bet size (probably 1¢ is sufficient) is determined and each player has their individual bet trialed against the separate pool's own assigned P value (a prior race result probability is used). In such a manner a pari-mutuel pool, comporting with all pari-mutuel rules and regulations, is created. The owners of the Historical Racing Machines can separately commission this pool as they and the regulators determine. A small commission would make these payouts attractive. No commission would be good but pari-mutuel rules and regulations probably require some commission.

Say 500 people in a given 30 minute time span were playing and 300 people contributed an average of $4 in their predetermined winnings. $1200 would accumulate with say a 5% commission withdrawn ($60) leaving $1140 to be paid out to perhaps 6 to 10 people in that given half hour. That means each of, say six winning players, might average an extra $190 in prize money aside from the regularly awarded Bonus Round money paid out. The $190 is an average for the example of 6 winners being pari-mutuel (you might have any number of players winning as little as one time for one cent, while others get six, seven, or more winners. Any result possible. The source of the money fueling this pari-mutuel pool is really the “intermediate payments”, or “updated payments” as explained below, from winning bets paid to the players, between the initial payout made and the final (post pool closing) “truing”, residual payout made.

All of the keeping track of such details and the creation of this pool, as well as many other things discussed according to the invention, is only practically possible in a server based Historical Racing Pari-mutuel system. Only a server based game could readily handle these inputs and outputs. This is a new, unique methodology applied to a Historical Racing Device.

The Historical Racing Devices must also have a volatility profile consistent with the player’s expectations that has developed over their years of playing Fixed Odds Slot Machines. While the entertainment aspect is important to the players’ expectations to be met, of equal importance is to be able to make the Historical Racing Machine perform within the expectations of the players as to the frequency and balance of wins and losses. Long losing streaks will make the devices unpopular with players. The invention achieves these ends.

As a pari-mutuel device, Historical Racing Machines must be able to meet the strict pari-mutuel regulations governing the distribution of the betting pools. Distribution of betting pools is not straight forward for Historical Racing because in order to compete with Fixed Odds Slots they must be able to pay winners instantly. But this presents a problem because to pay pools out pari-mutuelly the payout was thought to be necessarily known at payout, and that amount cannot be known until the wagering pool is complete. Paying pari-mutuelly instantly is a paradox for Historical Racing Machines that don’t know what the payout should total at the time they do make their initial payment. Yet they must in order to compete with instant paying Fixed Odds Slots. Pari-mutuel Historical Racing Machines solve this paradox by breaking the payout into two payments. Knowing the programmed winning result probability coupled with the fact that a large number of players are competing allows the devices to calculate the probable payout within reason. Actual variations or excursions from expected payouts will occur from the winning result’s actual probability. An example, if a jackpot is programmed to be 300 to 1 odds (P value 1/301=0.00332225913) the Historical Racing Device can pay initially approximately 180 to 1 under most circumstances. As the game progresses and the pool eventually closes perhaps the final odds will then calculate at 263.56 to 1. Now the Historical Racing Device concludes the payout with a payment of 83.56 to 1 (note: a few more winners ended up than predicted is why the final odds paid off at 263.56 to 1 rather than 300 to 1 [omitting commissions for simplicity]). In such a manner, Historical Racing Devices get around the paradox. But the problem now is as shown above. The Historical Racing Devices must hold on to an inordinately large fraction of a player’s money before the wagering pool concludes and the payouts can be “trued” for all winning betters.

To cure that problem, the entertaining Pari-Mutuel Bonus Round (regular and alternative embodiment) is used to both entertain the player and meet the pari-mutuel obligation of equal payouts for all players by dividing the total pari-mutuel payout into not two payments but into several. For example:

Say we have a jackpot (race result) with a probability of 1÷1501=0.00066622251 or odds against of 1500 to 1. A wagering pool is set up, for simplicity a trifecta pool, where the winning numbers were #4, #5, #6 (4-5-6). Commissions will be ignored for illustrative simplicity again. The P value is programmed for each and every three horse number selection made at the live underlying race and the players are allowed to play. Perhaps this particular pool will “live” for 40 minutes before it closes and perhaps $8,500 dollars will accumulate, ignoring commissions, at its close. Now like any pari-mutuel pool at closing it is a simple matter to calculate payouts using standard calculations or even net pool pricing, if desired. Here standard calculations are used. Let’s say our 4-5-6 trifecta was accessed as a winner by a few more winning bets than expected by the probabilities programmed. At the pool’s close we find the odds payout (ignoring commissions) to be 1304.73 to 1. Let’s look at three winning Bettors in that pool.

Winner A: Bet 4¢ and won the bet very early in the pool’s life and was afforded, under the invention, an initial payout of, say, 30% of the expected 1500 to 1 odds or 450 to 1 (initial payout)=$18.00; now 5 minutes later a Bonus Round payment=$3.50; now 4 minutes later a Bonus Round payment=$5.25; now 6 minutes later a Bonus Round payment=$3.75; now 4 minutes later a Bonus Round payment=4.50; now 7 minutes later a Bonus Round payment=$3.00 and now 14 minutes later a Bonus Round payment=$7.25. Pool closes.

| | |
|---|---|
| Bet 4¢ | |
| Final Odds 1304.73 to 1 | (Final Residual Payout) = $6.97 |
| Expected Odds 1500 to 1 | $52.22 total summed payment to winner A |
| (Exclude Commissions for Simplicity) | Includes 4¢ bet back |
| 1304.73 | |
| × 4¢ | Bet returned |
| $52.1892 | Winnings |
| + .04 | Original bet returned |
| $52.22 | (Breakage 0.92¢) |

Winner B: Bet 2¢ and won the bet 20 minutes into the pool’s life and was afforded under my invention an initial payout of, say, 26% of the expected 1500 to 1 odds or 390 to 1 (initial payout)=$7.80; now 5 minutes later a Bonus Round payment=$1.75; now 3 minutes later a Bonus Round payment=$2.10; now 4 minutes later a Bonus Round payment=$3.90; now 2 minutes later a Bonus Round payment=2.75; now 6 minutes later a Bonus Round payment=$4.00 Pool closes.

Here, the Initial Payout is reduced as an algorithm examining the conditions present at the moment of the winning bet analyzed slightly more winners were falling than expected which would depress the final payout below programmed probability; as well the number of players betting, their rate and amount of betting, and reversion to the mean were all factored in to establish the initial payout and the time remaining was also considered in establishing this initial payout. This is done to avoid overpayments. Other safeguards such as an algorithm that can close a pool early if it becomes close to allowing an initial payout that might exceed the fully matured payout calculated on the pool's close is also in place. Even other safeguards beyond the scope of this invention can be employed to safeguard payments (account wagering accounting system and IRS withholding requirements are two examples.)

| | |
|---|---|
| Bet 2¢ | |
| Final Odds 1304.73 to 1 | (Final Residual Payout) = $3.79 |
| Expected Odds 1500 to 1 | $26.11 total summed payment to winner B |
| (Exclude Commissions for Simplicity) | Includes 2¢ bet back |
| 1304.73 | |
| × 2¢ | Bet returned |
| 26.0946 | Winnings |
| .02 | Original bet returned |
| $26.11 | (Breakage (0.46¢) |

Winner C: Bet 1¢ and won the bet 38 minutes in the pool's life and was afforded under the invention an initial payout of, say, 60% of the expected 1500 to 1 odds (here the algorithm pays a large percentage because despite the plethora of more than expected winners, all other factors make this percentage payout very safe from possibly exceeding the final payout total) or 900 to 1 (initial payout)=$9.00; now 1 minute later a Bonus Round payment=$2.00. Pool closes.

| | |
|---|---|
| Bet 1¢ | |
| Final Odds 1304.73 to 1 | (Final Residual Payout) = $2.05 |
| Expected Odds 1500 to 1 | $13.05 total summed payment to winner C |
| (Exclude Commissions for Simplicity) | Includes 1¢ bet back |
| 1304.73 | |
| × 1¢ | Bet returned |
| 13.0473 | Winnings |
| .04 | Original bet returned |
| $13.05 | (Breakage 0.73¢) |

As one can see, by utilizing the entertaining Pari-Mutuel Bonus Round to distribute money back to the player in a constant stream the system is able to replicate closely the volatility of the Fixed Odds Penny Slot Machine. The system prevents "starving" the player of his/her own money by supplying him/her his/her winnings in a steady state manner. By utilizing the above example within a grid of 50 (or more or less) pools, and playing the pools simultaneously, the system is able to integrate pari-mutuel play utilizing this Pari-Mutuel Bonus Round invention for entertainment, but as importantly, to steady the flow of money back to the player in a sufficient manner to meet player expectations, and do so in a pari-mutuel compliant matter to maintain legality with racing jurisdictions.

A "mass effect" takes place with simultaneous play of many pools at once. Some pools will end up paying more than expected, some less, and many very close to expected. By playing many pools simultaneously the "excursions" of actual payouts versus predicted payouts become averaged so that the net results of money owed to the player, taking into account multiple pool wins, becomes, in-total, very close to the sum predicted. This self-insuring phenomenon leads to relatively very small amounts of player money needing to be withheld to protect against overpayments. This phenomenon allows payout of initially a larger percentage of the predicted payout than would otherwise be thought to be safe, and quickening of the total summed intermediate payouts on each won bet more and more quickly through multiple Bonus Round payments as time erosion of the pools take place. With only a slight delay at each player's beginning of a session, the cash flow quickly reaches a steady state that very closely replicates cash flow of a fixed odds device. At pool conclusion, a final "truing" (Final Residual Payout) takes place equalizing everyone's payment in ratio to each players winning bet. Notice in example A, B, C, the payout to each player winning the trifecta pool was proportionate to their bet and paid at the same odds. The Breakage shown in the examples will actually spread over the multiple pools so that at the end of play a player can lose no more than a fraction of 1¢ for any full session. The divisions of all wagering pools will comport to conventional racing's methods of pari-mutuel pool division and distribution and will be indistinguishable if the Historical Racing's wagering pools are compared to those of conventional live race wagering pools.

An exemplary wagering system, according to the present invention, is shown at 10 in FIG. 1. The wagering system 10 is shown in schematic form to encompass virtually a limitless number of different variations of each of the components depicted, and their interaction. Where the parts herein correspond to those shown in my U.S. Pat. Nos. 5,888,136 and 6,152,822, any details therein not described herein will be deemed to be incorporated by reference. Generally, the precise details of the exemplary system 10 are not critical to fully comprehending the present invention.

The wagering system consists of a random number generator 12 that has a wagering base 14 which is randomly accessed by an input wager. A particular wager is made at any one of a plurality of input wagering terminals 16, 18, 20, respectively having inputs 22, 24, 26 that might be of any known or readily derivable construction and suitable for communicating with the random number generator 12. The number of terminals 16, 18, 20 depicted is exemplary in nature only as virtually any, potentially very large, number of terminals is contemplated.

Within the wagering base 14 is contained certain information 28 that is preferably based at least in part upon the outcome of at least one horse/dog race or jai alai game that has been completed with a pre-assigned probability value for accessing the information in the wagering base through each input wager.

At least one computer/processor 30 interacts directly or indirectly with the random number generator 12 and is configured/programmed to identify: (a) a preliminary return amount for a first input wager that accesses the certain information 28 in the wagering base 14 based at least in part upon the number of input wagers from the plurality of input wagering terminals 16, 18, 20 that have accessed the certain information 28 during a wagering period; (b) a final return amount for the first input wager that accessed the certain information 28 at the expiration of the wagering period based at least in part upon the number of input wagers from the plurality of input wagering terminals 16, 18, 20 that have accessed the certain information in the wagering base 14 upon the expiration of the wagering period; and (c) an updated return amount for the first input wager that accessed the certain information 28 in the wagering base 14 based at least in part upon the number of input wagers from the plurality of input wagering terminals 16, 18, 20 that have accessed the certain information 28 during the wagering period between when the preliminary and final return amounts are identified.

Aside from identifying an updated return amount, the system 10 may incorporate other stimulus, as described above and typical to bonus rounds in Penny Video Slot Machines.

The system 10 may be configured to give the user various options, as described above, among which are to not use the updated return amount and wait for a final return amount to be determined; invest some or all of the updated return amount into another pool or pools for wagering purposes, etc.

Multiple updated return amounts can be identified, and made accessible for use by the bettor, between when the preliminary and final return amounts are identified.

The random number generator 12 may be integrally formed with the computer/processor 30. Alternatively, one or more computers/processors 30 can be otherwise configured as separate components to interact with the random number generator 12 as described.

Figure 2:
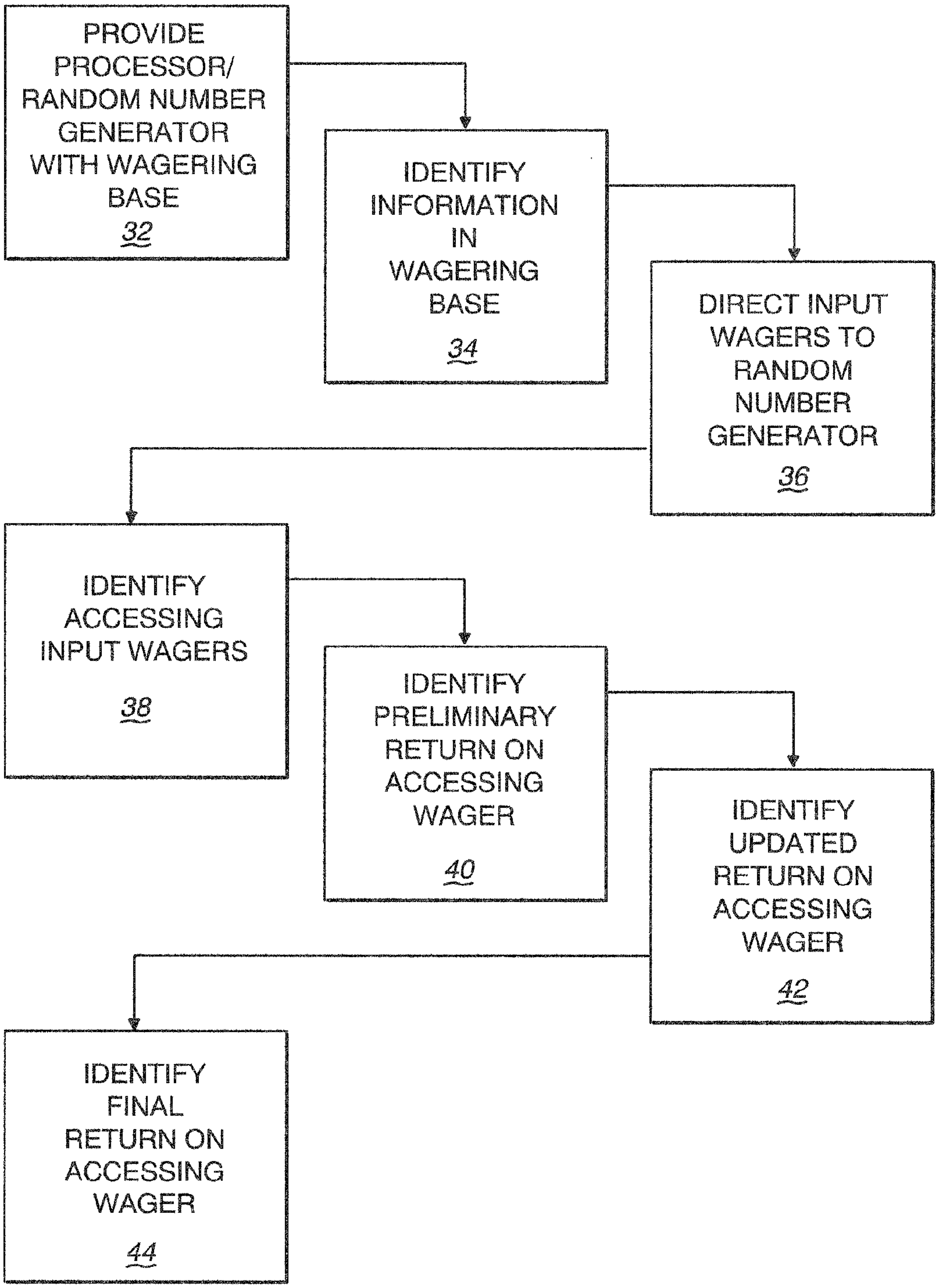
FIG. 2 is a flow diagram representation of a method of wagering, according to the present invention.

With the inventive system 10, or a like system, a method of wagering, according to the present invention, can be carried out during the wagering period, as shown in flow diagram form in FIG. 2.

More specifically, as shown at block 32, a random number generator is provided that has a wagering base derived at least in part from the outcome of at least one horse/dog race or jai alai game that has previously been completed.

As shown at block 34, certain information in the wagering base is identified that is based at least in part on the outcome of the at least one horse/dog race or jai alai game that has previously been completed and accessible through an input wager, with the probability of accessing the certain information in the wagering base through an input wager being different.

As shown at block 36, input wagers are directed to the random number generator during the wagering period from each of multiple locations.

As shown at block 38, input wagers that have accessed the information in the wagering base are identified.

As shown at block 40, before the expiration of the wagering period, a preliminary return amount is identified through the computer/processor for a first input wager that accesses the certain information of the wagering base, based at least in part upon the total number of input wagers from the multiple locations that have accessed the information.

As shown at block 42, a final return amount is identified for the first input wager that accessed the information, with the final return amount identified at the expiration of the wagering period, based at least in part upon the total number of input wagers from the multiple locations that accessed the certain information upon the expiration of the wagering period.

As shown at block 44, during the wagering period between when the preliminary and final return amounts are identified, an updated return amount is identified for the first input wager that accessed the information in the wagering base, based at least in part upon the number in input wagers from the multiple locations that have accessed the information.

The foregoing disclosure of specific embodiments is intended to be illustrative of the broad concepts comprehended by the invention.

The invention claimed is:

1. A method of conducting wagering during a wagering period, the method comprising the steps of:

providing a random number generator that has a wagering base that is derived at least in part from the outcome of at least one horse/dog race or jai alai game that has previously been completed, wherein certain information in the wagering base is based at least in part on the outcome of the at least one horse/dog race or jai alai game that has previously been completed and accessible through an input wager and wherein the probability of accessing the certain information in the wagering base through input wagers is different;

causing input wagers made to access the certain information to be directed to the random number generator during the wagering period from separate terminals at each of multiple locations;

through at least one processor, identifying whether input wagers from the separate terminals have accessed any of the certain information in the wagering base;

through the at least one processor, before the expiration of the wagering period, identifying a preliminary return amount for a first input wager that accesses the certain information in the wagering base based at least in part upon the total number of input wagers from the separate terminals that have accessed the certain information;

through the at least one processor, identifying a final return amount for the first input wager that accessed the certain information, the final return amount identified at the expiration of the wagering period based at least in part upon the total number of input wagers from the separate terminals that accessed the certain information upon the expiration of the wagering period; and through the at least one processor, during the wagering period between when the preliminary and final return amounts are identified: a) identifying an updated return amount for the first input wager that accessed the certain information in the wagering base based at least in part upon the number of input wagers from the separate terminals that have accessed the certain information; and b) making an amount based upon the updated return amount available to a bettor who placed the first input wager to use in making a further wager before the expiration of the wagering period.

2. The method of wagering during a wagering period according to claim 1 wherein the step of making an amount based upon the updated return amount available comprises making an amount based upon the updated return amount available to a bettor who placed the first input wager to make another input wager in a separate pool.

3. A wagering system comprising:

a random number generator that has a wagering base which is randomly accessed by an input wager, said wagering base comprising certain information in the wagering base that is based at least in part upon the outcome of at least one horse/dog race or jai alai game that has been completed with a pre-assigned probability value for accessing the certain information in the wagering base through each input wager; and a plurality of input wagering terminals for directing an input wager to access the certain information; and at least one processor configured to identify: a) a preliminary return amount for a first input wager that accesses the certain information in the wagering base based at least in part upon the number of input wagers from the plurality of input wagering terminals that have accessed the certain information during a wagering period; b) a final return amount for the first input wager that accessed the certain information at the expiration of the wagering period based at least in part upon the number of input wagers from the plurality of input wagering terminals that have accessed the certain information in the wagering base upon the expiration of the wagering period; and c) an updated return amount for the first input wager that accessed the certain information in the wagering base based at least in part upon the number of input wagers from the plurality of input wagering terminals that have accessed the certain information during the wagering period between when the preliminary and final return amounts are identified, the at least one processor further configured to make an amount based upon the updated return amount available to a bettor who placed the first input wager and to allow the bettor to make a further wager using the updated return amount before the expiration of a wagering period during which the first input wager was placed.

4. The wagering system according to claim 3 wherein the at least one processor is configured to make the amount based upon the updated return amount available to the bettor who placed the first input wager to place another input wager in a separate pool.

* * * * *